United States Patent [19]

Kleinsorgen et al.

[11] 4,407,338
[45] Oct. 4, 1983

[54] METERING OF PASTE ONTO A CARRIER TAPE

[75] Inventors: Klaus Kleinsorgen, Kelkheim; Erich Münch, Frankfurt am Main, both of Fed. Rep. of Germany

[73] Assignee: Varta Batterie Aktiengesellschaft, Hanover, Fed. Rep. of Germany

[21] Appl. No.: 217,760

[22] Filed: Dec. 18, 1980

[30] Foreign Application Priority Data

Dec. 22, 1979 [DE] Fed. Rep. of Germany ....... 2952234

[51] Int. Cl.³ .......................... B65B 3/04; H01M 4/82
[52] U.S. Cl. ........................................ 141/1; 141/280
[58] Field of Search ....................... 141/1, 1.1, 31, 32, 141/125, 280, 283; 29/623.1, 623.5; 429/233, 241

[56] References Cited

U.S. PATENT DOCUMENTS

| 3,903,940 | 9/1975 | Durr et al. | 141/32 |
| 4,106,535 | 8/1978 | Davis | 141/125 X |
| 4,217,939 | 8/1980 | Yanagihara et al. | 141/125 X |

*Primary Examiner*—Frederick R. Schmidt
*Attorney, Agent, or Firm*—Weiser & Stapler

[57] ABSTRACT

In metering viscous paste from a paste pot onto a carrier tape using a scraper, uniform coating thickness is obtained by causing the scraper to oscillate relative to the paste in a plane parallel to the carrier tape, with a speed which equals at least the tear velocity between scraper and paste. The scraper projects into the paste to a depth at which the paste does not yet firmly adhere to the carrier, and holds back the excess paste free of torn-off portions even at high tape speeds. An important application of this method is in the production of raw sinter tape in connection with the manufacture of electrodes for galvanic elements.

5 Claims, 3 Drawing Figures

METERING OF PASTE ONTO A CARRIER TAPE

The invention relates to a method for metering paste which has been applied to a tape-like carrier, and in which the metering takes place by means of a scraping device, as well as to apparatus for practicing the method.

Preferred applications of the invention reside in the manufacture of electrodes for galvanic elements. For example, in the manufacture of the raw sinter tape, as the carrier frame for active nickel oxide or cadmium masses from nickel powder and water soluble carboxymethylcellulose, a viscous paste is kneaded and applied to a nickel-plated perforated steel tape. During the subsequent sinter process, in a pass-through oven with an inert gas or reducing atmosphere, the organic material is destroyed. Grid plates for lead storage batteries are pasted with active mass and, in the manufacture of various types of pressed electrodes, a pastable active material is applied to a frame and then thickened through pressing or rolling.

Many methods are known for applying a paste to frame structures and so are applying and pasting devices. For example, in accordance with German Patent Publication (Auslegeschrift) No. 1,671,839, use is made during pasting of the thixotropic properties of pasty masses.

This thixotropy is, itself, a reversible isothermic gel-sol transformation. Certain gels from sols with anisodimensional particles can be liquefied through mechanical processes, such as shaking or stirring, into a sol. After a given time, this sol again solidifies into a gel. Something very similar takes place during the known pasting method for plate grids of lead storage batteries, in which the plate grid, in each instance, has applied to it a measured quantity of paste. This paste, which is not fluid, is then transformed into a fluid state under the influence of a vibrating acoustic diaphragm (sonotrode) with the result that the paste now flows into the hollows of the grid and fills them out. A scraping knife, which is passed by the plate grids during further transport on a belt, has only a smoothing function but not one of metering the paste application or of distributing same.

From German Patent Publication (Auslegeschrift) No. 2,602,904, it is known to coat with track-shaped grid material. In so doing, the paste is initially applied to a nonhydroscopic intermediate tape from an extruder with predetermined volumetric flow rate. From this it is then transferred to the actual frame tape. The metering and regulating of the paste quantity has already been accomplished prior to that step. The introduction of an intermediate tape and a metering cell which measures the application thickness and which is coupled back to the extruder, makes this whole installation complicated and too slow for high tape speeds.

For desired tape speeds of about 90 meters/hour and up, simpler pasting devices with a scraper have the problem that pastes of predetermined viscosity partially cling to it, and adhesion forces make it impossible to achieve uniform coating. For pasted tapes, it is further true that the tape thickness does not limit the coating application, whereas, for the previously mentioned grid materials, the height to which the paste rises and the thickness of the carrier are approximately equal.

Accordingly, it is an object of the present invention to provide a metering method for paste application in which the application thickness is uniformly controlled by means of a scraping arrangement, independently of the carrier material used.

This and other objects which will appear are accomplished in accordance with the invention by moving the scraper relative to the paste and by making the speed of this movement at least equal to the tear velocity between scraper and paste.

The tear velocity can be determined by deriving so-called roto-visco-flow curves. In these flow curves, the push force (dyne/cm$^2$) is measured as a function of the frequency of rotation u (min$^{-1}$) or the shear velocity v (sec$^{-1}$). Starting with low frequencies of rotation, the push force rises progressively and finally reaches a maximum which corresponds to the tear velocity. For still further increases in frequency of rotation, it declines and approaches a constant value.

By making the relative movement of a scraper at least equal to the tear velocity, and preferably by making it so high that it corresponds to the shear velocity in the region of constant push force, the adhesion between the scraper and paste which has previously been applied to the carrier tape is essentially minimized. An important result of this procedure is that smooth and uniformly paste-coated tapes are obtained, even at high tape velocities.

In a preferred manner of practicing the method embodying this invention, provisions are made to cause the moveable scraper which contacts the paste to oscillate in a plane which lies parallel to the surface of the tape-like carrier material. In this manner, it is best suited to its task to metering out the applied quantity. In so doing, it dips into the paste which passes beneath it to a depth at which the same is not yet held in place by the meshes or pores of the carrier material. The oscillating scraper reduces the free excess of the previously applied paste to a predetermined height and meters the paste application by holding back the excess paste, free of torn-off pieces.

As the tape-like carrier material there can be used sinter foils, metal nets, metal webs, or expanded metal.

For further details, reference is made to the explanation which follows in light of the accompanying drawings wherein.

Figure 1:
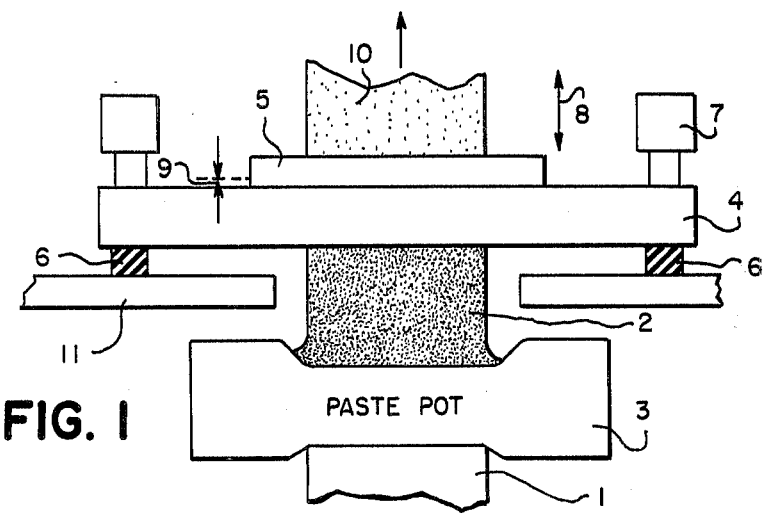
FIG. 1 shows a side view of a device in which the scraper is a straight-edge and the reciprocating drive consists of a magnetic vibrator.
Figure 2:
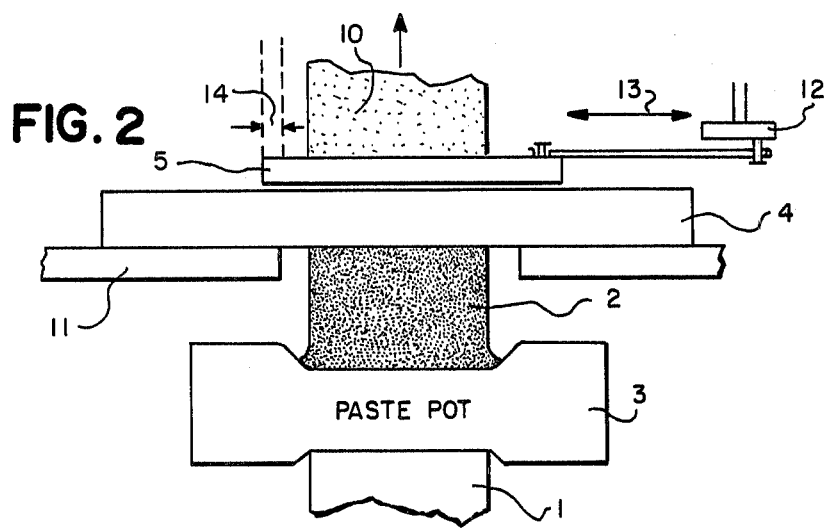
FIG. 2 shows a similar device in which the scraper is also a straight-edge, but in which the reciprocating movement is produced by an eccentric.

Referring to FIGS. 1 and 2, the carrier tape 1 to which excess paste 2 adheres exits from pasting pot 3, moving in an upwardly direction in the plane of the drawing paper, and then passes a base plate 4 which serves as the mounting for the scraper. In FIG. 1, this scraper is a straight-edge 5 which is displaced by a magnetic vibrator 7 together with base plate 4 resting on rubber mounts 6. In so doing, it oscillates in a plane parallel to the surface to the drawing paper. The oscillating direction 8 is parallel to the direction of movement of the tape. The amplitude of oscillation 9 is relatively small. The carrier tape, with its metered and smoothed paste coating 10, is introduced into a drying oven, whose framework 11 can also provide the support for the entire installation embodying the invention.

As shown in FIG. 2, the scraper 5 is freely displaced with respect to base plate 4 by means of an eccentric 12 in a direction 13 which is transverse to the direction of movement of tape 1. Also, the amplitude 14 of this back and forth movement is relatively large.

Figure 3:
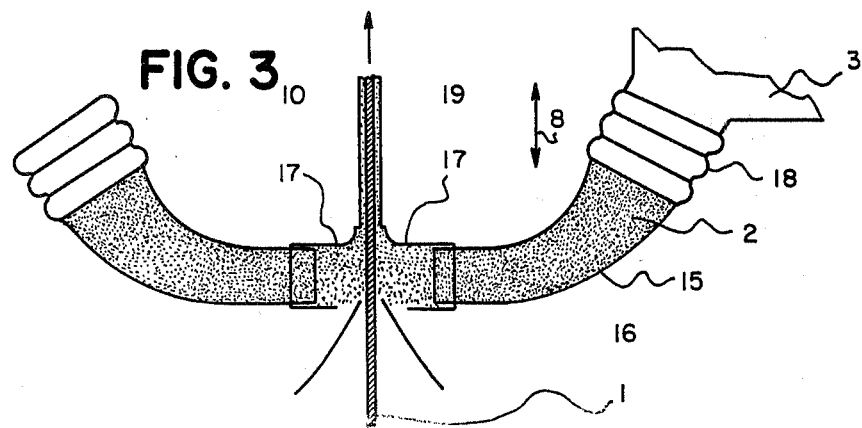
FIG. 3 shows the utilization of vibrating applicator nozzles as scrapers for the paste.

In FIG. 3, the method embodying the invention is carried out by the mouth pieces of two vibrating nozzles 15. The carrier tape 1, which is here shown edge-on, is guided by means of an inlet guide 16 past oppositely positioned nozzle mouth pieces 17, whose outlet slot corresponds to the width of the carrier tape. There it is coated with paste 2. A bellows connection 18 leading to paste storage container 3, with an in-between connected transport pump (not shown), makes it possible for the nozzles 15 as a whole to vibrate in the direction 8, which coincides with the direction of movement of the tape.

The upper edges of mouthpieces 17 are conically shaped at a slant in the direction of movement of the tape. This promotes smooth passage of the tape between them. The width of the pasting gap 19 is determined by the displacement between mouth pieces 17, particularly at their upper edges.

We claim:

1. A method of metering paste applied to a tape-like carrier material, in which the metering takes place by means of a scraper device, said method comprising
   moving the scraper relative to the paste without contacting the tape and the edge of the scraper nearest the tape is spaced from the tape by a predetermined distance which is less than the thickness of the applied paste, so that said scraper projects into the thickness of said applied paste,
   oscillating said scraper in a plane parallel to the tape, and
   performing the movement of said scraper at a speed which equals at least the tear velocity between the scraper and the paste.

2. The method of claim 1 wherein said scraper projects into the applied paste thickness to a depth at which the paste does not yet adhere firmly to the carrier,
   whereby the scraper holds back the excess paste without tearing off portions of the metered paste.

3. The method of claim 2 wherein the tape moves at high speed.

4. The method of claim 1 wherein the scraper movement speed corresponds to the shear velocity in the region of constant push force, whereby the adhesion between the scraper and the applied paste is substantially minimized.

5. The method of claim 1 wherein there is a scraper constituted of a paste applicator nozzle on each side of the tape.

* * * * *